US009264900B2

(12) United States Patent
Sun et al.

(10) Patent No.: US 9,264,900 B2
(45) Date of Patent: Feb. 16, 2016

(54) FAST AUTHENTICATION FOR INTER-DOMAIN HANDOVERS

(71) Applicant: Huawei Technologies Co., Ltd., Shenzhen (CN)

(72) Inventors: Sheng Sun, Kanata (CA); Osama Aboul-Magd, Kanata (CA); Kwok Shum (Edward) Au, Shenzhen (CN); Junghoon Suh, Kanata (CA); Alex Stephenne, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/218,567

(22) Filed: Mar. 18, 2014

(65) Prior Publication Data

US 2015/0271668 A1 Sep. 24, 2015

(51) Int. Cl.
*H04M 1/66* (2006.01)
*H04W 12/06* (2009.01)
*H04W 36/00* (2009.01)
*H04W 12/04* (2009.01)

(52) U.S. Cl.
CPC .............. *H04W 12/06* (2013.01); *H04W 12/04* (2013.01); *H04W 36/0022* (2013.01)

(58) Field of Classification Search
CPC .............. H04L 9/0844; H04L 2209/80; H04L 63/0442; H04L 63/0823; H04L 9/0841; H04L 63/0869; H04L 9/0825; H04L 9/3247; H04L 63/0435; H04L 9/321; H04L 9/3273; H04W 12/06; H04W 12/04; H04W 12/08

USPC .......................................................... 455/411
See application file for complete search history.

(56) References Cited

U.S. PATENT DOCUMENTS

2003/0163733 A1* 8/2003 Barriga-Caceres et al. .. 713/201
2010/0262834 A1* 10/2010 Freeman et al. .............. 713/184
2013/0046976 A1* 2/2013 Rosati et al. .................. 713/168

OTHER PUBLICATIONS

Arkko, J. et al., "Extensible Authentication Protocol Method for 3rd Generation Authentication and Key Agreement (EAP-AKA)," RFC 4187, Jan. 2006, 79 pages.
3GPP, "WLAN-Pseudonym Generation of EAP-SIm/ADA," 3GPP TSG SA WG3 Security, S3-020654, Nov. 19-22, 2002, 5 pages.

* cited by examiner

*Primary Examiner* — Kwasi Karikari
(74) *Attorney, Agent, or Firm* — Slater & Matsil, L.L.P.

(57) ABSTRACT

Fast mobile device authentication can be achieved during inter-domain handovers between administrative domains operating under a federated service agreement using pseudonym identifications (PID). Specifically, the mobile device may derive a PID when obtaining authentication in a first wireless network, and then use the PID to obtain fast authentication in a second wireless network. The PID may be generated during an Elliptic curve Diffie-Hellman (ECDH) authentication procedure using public keys associated with the mobile device and the first wireless network. The PID (or a derivative thereof) may then be provided to an authentication server in a second wireless network for validation. The PID may be validated by the second authentication server via online or offline validation procedures. The PID can also be used as an electronic coupon for accessing the second network.

15 Claims, 9 Drawing Sheets

FAST AUTHENTICATION FOR INTER-DOMAIN HANDOVERS

TECHNICAL FIELD

The present invention relates generally to managing the allocation of resources in a network, and in particular embodiments, to techniques and mechanisms for fast authentication during inter-domain handovers.

BACKGROUND

Mobile station authentication is commonly performed during call setup to ensure that only valid subscribers are permitted access to a wireless network. To achieve authentication, mobile devices may be required to participate in an authentication protocol with an authentication, authorization and accounting (AAA) server prior to accessing the network, which may introduce significant latencies into session establishment. Indeed, delays attributable to mobile station authentication may significantly reduce quality of service (QoS) for mobile subscribers that are traveling between different network domains, such as a mobile subscriber that is being handed over from a cellular network (e.g., a long term evolution (LTE) network) to a wireless local area network (WLAN), e.g., a Wi-Fi network. Accordingly, techniques for quickly authenticating mobile stations during inter-domain handovers are desired.

SUMMARY OF THE INVENTION

Technical advantages are generally achieved, by embodiments of this disclosure which describe techniques and mechanisms for fast authentication during inter-domain handovers.

In accordance with an embodiment, a method for fast authentication is provided. In this example, the method includes deriving a pseudonym identification (PID) during an Elliptic Curve Diffie-Hellman (ECDH) key exchange with a first authentication server in a first wireless access network, and obtaining authentication from a second authentication server in a second wireless access network in accordance with the PID derived during the ECDH key exchange. The first wireless network and the second wireless network are controlled by different network operators. An apparatus for performing this method is also provided.

In accordance with another embodiment, another method for fast authentication is provided. In this example, the method includes receiving an authentication request from a mobile station at a first authentication server in a first wireless network. The authentication request carries a pseudonym identification (PID) (or a derivative thereof) associated with a second wireless network. The first wireless network and the second wireless network are controlled by different network operators. The method further includes determining whether the PID is valid, and granting authentication to the mobile station in the first wireless network when the PID is valid. An apparatus for performing this method is also provided.

In accordance with yet another embodiment, a method for providing wireless access to subscribers of a different network service provider is provided. In this example, the method includes receiving a pseudonym identification (PID) from a mobile station attempting to access a first wireless network by an accounting server associated with the first wireless network. The method further includes validating the PID to confirm that the mobile station is an authorized subscriber in a second wireless network, identifying an access coupon associated with the PID, the access coupon configured to provide subscribers of the second wireless network with access to the first wireless network, and using the access coupon to account for a wireless access session of the mobile station in the first wireless network. The first wireless network is subject to a federated service agreement with an operator of the second wireless network. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure provide techniques for achieving fast mobile device authentication during inter-domain handovers between administrative domains operating under a federated service agreement. More specifically, a mobile device derives a pseudonym identification (PID) when obtaining authentication in a first wireless network, and then uses the PID to obtain fast authentication in a second wireless network. The PID may be generated during an Elliptic curve Diffie-Hellman (ECDH) authentication procedure using public keys associated with the mobile device and the first wireless network. The PID (or a derivative thereof) may then be provided by the mobile device to an authentication server in a second wireless network for validation. The PID may be validated by the second authentication server via online or offline validation procedures. When an online validation procedure is used, the authentication servers in the first network and the second network may communicate to validate the PID. Alternatively, when an offline validation procedure is used, then the second authentication server validates the PID by comparing the PID with a validation PID, which is computed separately by the second authentication server based on public keys associated with the mobile device and the first authentication server. The public key associated with the mobile device may be obtained from the mobile device, and the public key associated with the first authentication server may be a priori information that is known by the second network by virtue of the federated service agreement. In some embodiments, the mobile device will use the PID as a coupon for the purpose of accessing the second network. These and other aspects are described in greater detail below.

Figure 1:
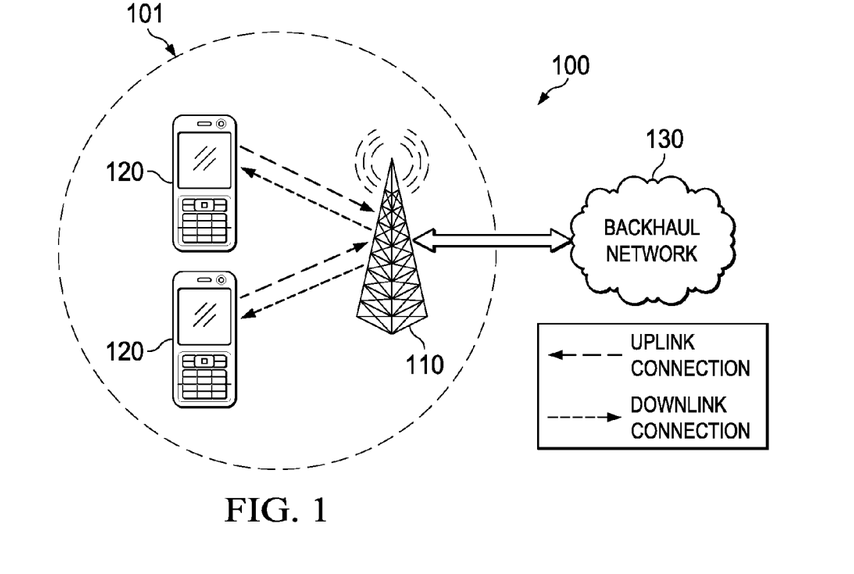
FIG. 1 illustrates a diagram of an embodiment wireless communications network.

FIG. 1 illustrates a network 100 for communicating data. The network 100 comprises an access point (AP) 110 having a coverage area 101, a plurality of mobile devices 120, and a backhaul network 130. The AP 110 may comprise any component capable of providing wireless access by, inter alia, establishing uplink (dashed line) and/or downlink (dotted line) connections with the mobile devices 120, such as a base station, an enhanced base station (eNB), a femtocell, and other wirelessly enabled devices. The mobile devices 120 may comprise any component capable of establishing a wireless connection with the AP 110, such as an user equipment (UE), a mobile station (STA), or other wirelessly enabled devices. The backhaul network 130 may be any component or collection of components that allow data to be exchanged between the AP 110 and a remote end (not shown). In some embodiments, the network 100 may comprise various other wireless devices, such as relays, low power nodes, etc.

Figure 2:
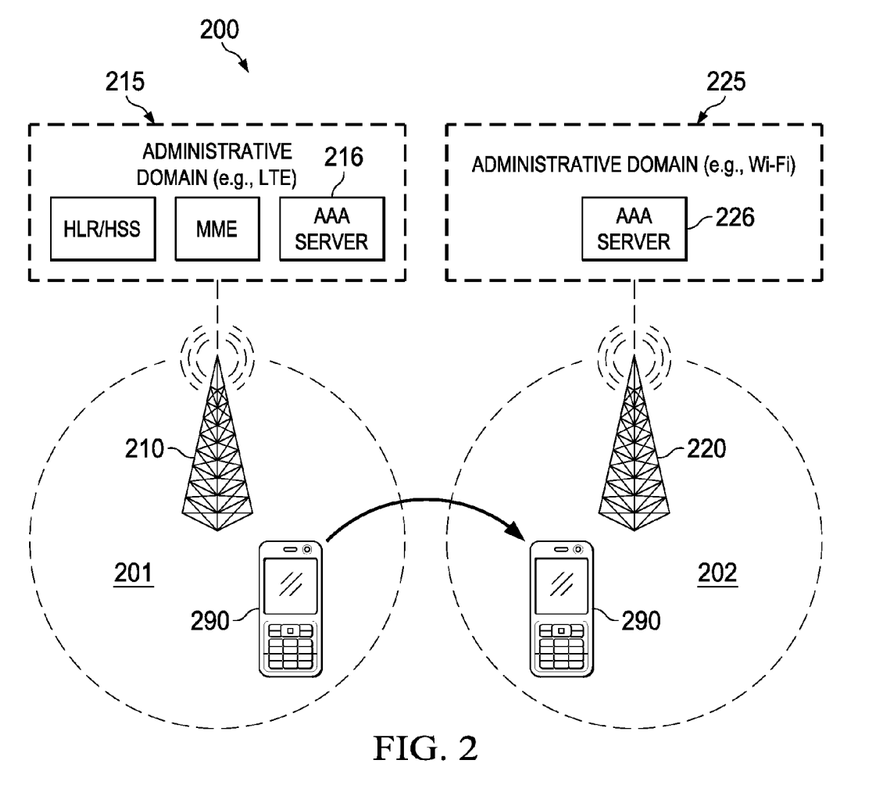
FIG. 2 illustrates a diagram of an embodiment inter-domain handover between wireless networks.

In some situations, a mobile device may migrate between wireless networks having different administrative domains. FIG. 2 illustrates a network 200 for supporting a handover of a mobile device 290 between wireless networks 201 and 202. In this example, the wireless networks 201, 202 are operated by different administrative domains 215, 225, and have different control planes inter-connecting the administrative domains 215, 225 with the respective access points 210, 220 in the wireless networks 201, 202. The administrative domains 215, 225 may be controlled by different network service providers, and may include different authentication authorization and accounting (AAA) servers 216, 226 for providing secured access to the wireless networks 201, 202. In some embodiments, the wireless networks 201, 202 may be operated in accordance with different wireless communications protocols. For example, the wireless network 201 may be a cellular network operating in accordance with a long term evolution (LTE) communications protocol, while the wireless network 202 may be a wireless local area network operating in accordance with Wi-Fi communications protocol. Other wireless communications protocols can also be used.

Figure 3:
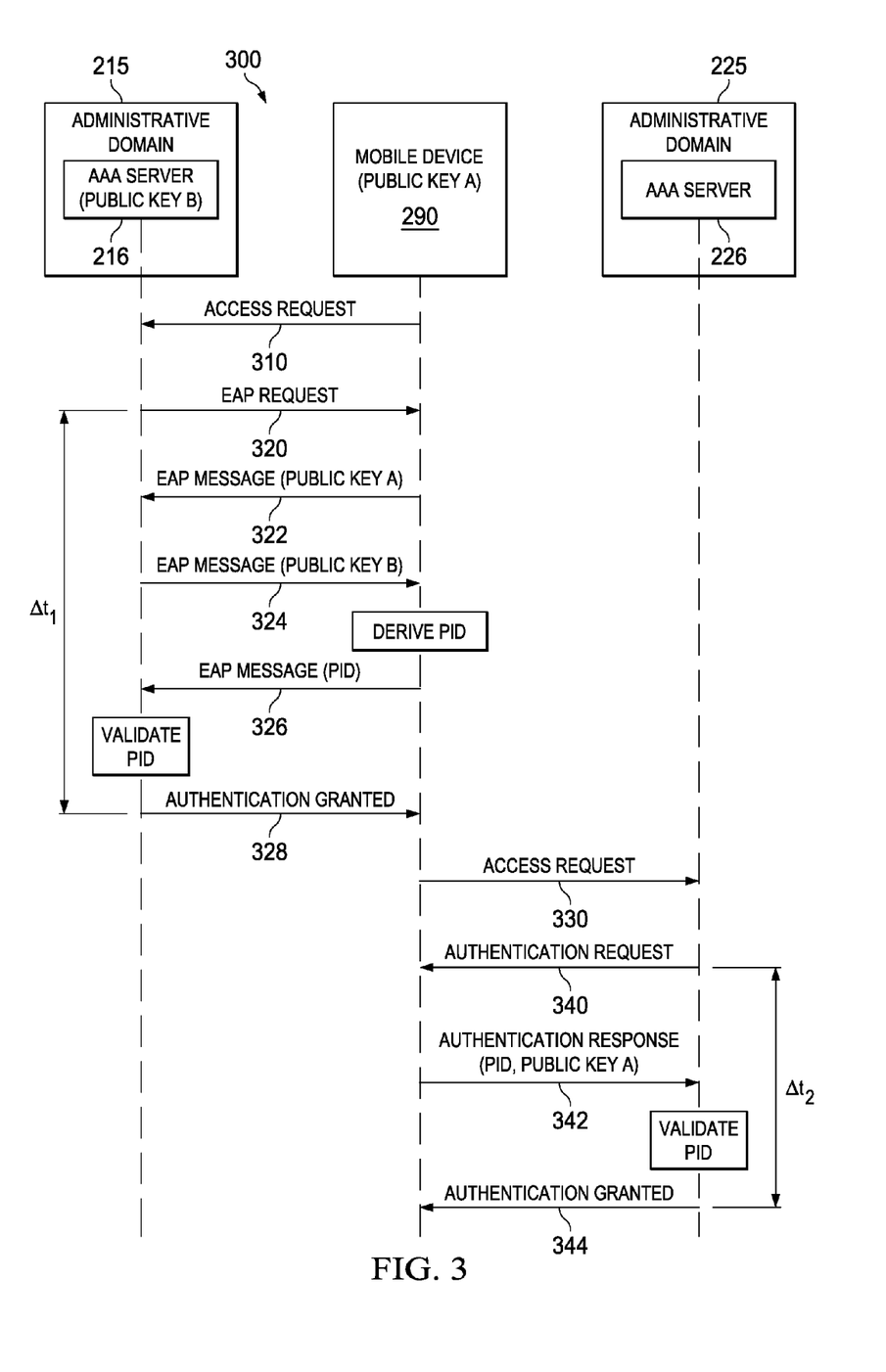
FIG. 3 illustrates a protocol diagram of an embodiment communications sequence for achieving fast authentication during inter-domain handovers.

Aspects of this disclosure provide techniques for achieving fast authentication during inter-domain handovers. FIG. 3 illustrates a communications sequence 300 for achieving fast authentication during an inter-domain handover in the network 200. As shown, the communications sequence 300 begins when the mobile device 290 sends an access request 310 to the AAA server 216, which responds with an Extensible Authentication Protocol (EAP) request 320 that initiates an EAP key exchange for purposes of authenticating the mobile device 290. The EAP key exchange is performed by exchanging the EAP messages 322-326 between the mobile device 290 and the AAA server 216. The EAP message 322 carries a public key of the mobile device 290 ("public key A") to the AAA server 216. The EAP message 324 carries a public key of the AAA server 216 ("public key B") to the mobile device 290. The UE derives a PID using the "public key B", and sends the PID (or a derivative of the PID) to the AAA server 216 via the EAP message 326. The AAA server 216 validates the PID (or the derivative of the PID), and then sends a message 328 granting authentication to the mobile device 290.

After obtaining authentication from the administrative domain 215, the mobile device 290 attempts to access a network associated with the administrative domain 225 by sending an access request 330 to the AAA server 226. The AAA server 226 responds by sending an authentication request 340 to the mobile device 290 to initiate a PID validation procedure for purposes of authenticating the mobile device 290 in the administrative domain 225. In some embodiments, the authentication request 340 includes an indication that the administrative domain 225 supports fast authentication with subscribers associated with the administrative domain 215. In response to receiving the authentication request 340, the mobile device 290 sends an authentication response 342 to the AAA server 226. The authentication response 342 includes the PID (or a derivative of the PID) obtained during the EAP key exchange with the AAA server 216, as well as the "public key A" of the mobile device 290. The AAA server 226 validates the PID (or the derivative of the PID), and then sends a message 344 granting authentication to the mobile device 290. Notably, the fast PID authentication requires considerably less time than the EAP authentication (e.g., $\Delta t_2 < \Delta t_1$), and therefore reduces latency during session establishment in the wireless network 202.

Figure 4:
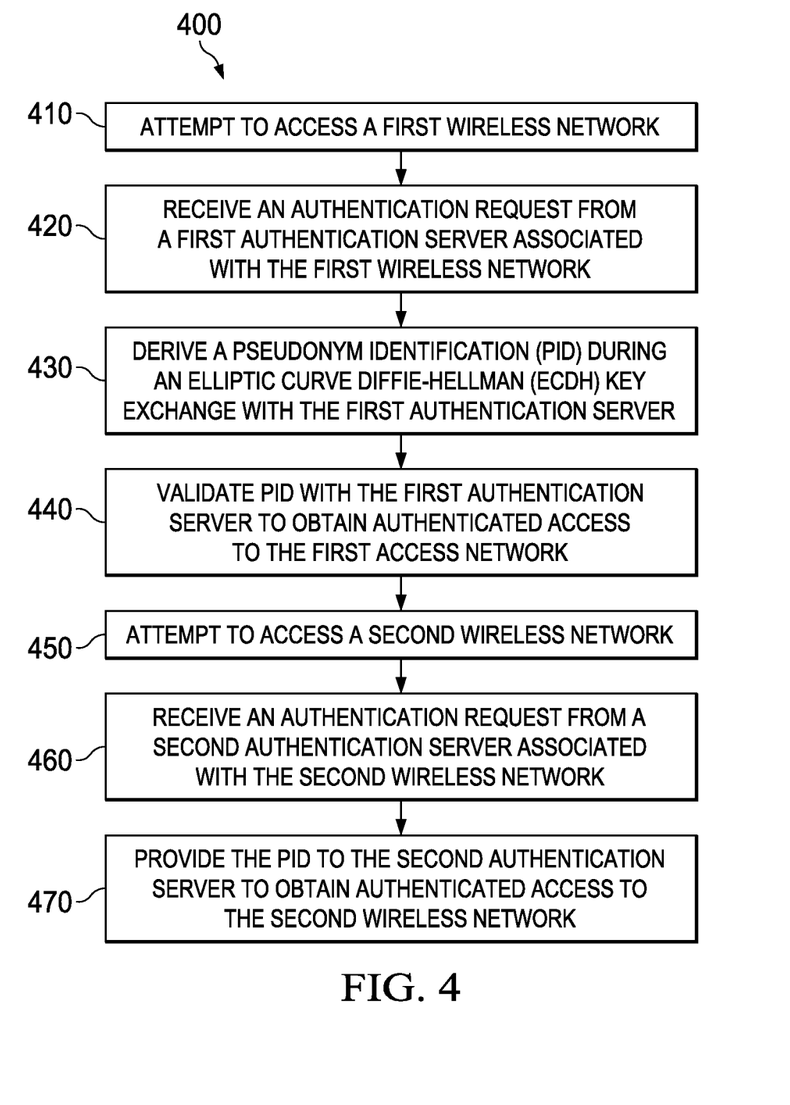
FIG. 4 illustrates a flowchart of an embodiment method for achieving fast authentication during inter-domain handovers.

Aspects of this disclosure provide methods for achieving fast authentication during inter-domain handovers. FIG. 4 illustrates a method 400 for achieving fast authentication during an inter-domain handover, as might be performed by a mobile device. As shown, the method 400 begins with step 410, where the mobile device attempts to access a first wireless network. Next, the method 400 proceeds to step 420, where the mobile device receives an authentication request from a first authentication server associated with the first wireless network. The authentication request may comprise an EAP authentication request, and may initiate an Elliptic curve Diffie-Hellman (ECDH) key exchange for the purpose of authenticating the mobile device in the first authentication network. Subsequently, the method 400 proceeds to step 430, where the mobile device derives a pseudonym identification (PID) during the ECDH key exchange with first authentication server. Next, the method 400 proceeds to step 440, where the mobile device validates the PID with the first authentication server to obtain authenticated access to first access network. Thereafter, the method 400 proceeds to step 450, where the mobile device attempts to access a second wireless network.

Subsequently, the method 400 proceeds to step 460, where the mobile device receives an authentication request from a second authentication server associated with the second wireless network. Thereafter, the method 400 proceeds to step 470, where the mobile device provides the PID to the second authentication server to obtain authenticated access to the second wireless network. In some embodiments, the second authentication server may validate the PID via an online authentication procedure, which may include communicating the PID to the first authentication server for validation. In other embodiments, the second authentication server may validate the PID via an offline authentication procedure. In such a case, the mobile device may provide a public key of the mobile device along with the PID, and the second authentication server may use the public key of the mobile device and a public key of the first authentication server to derive a valid PID. The validation PID is then compared to the PID provided by the mobile device, and if they match, then the PID is validated. The public key of the first authentication server may be a priori information of the second authentication server. For example, the public key of the first authentication server may have been previously provided to the first authentication server by virtue of a federated agreement between operators of the first and second wireless networks.

Figure 5:
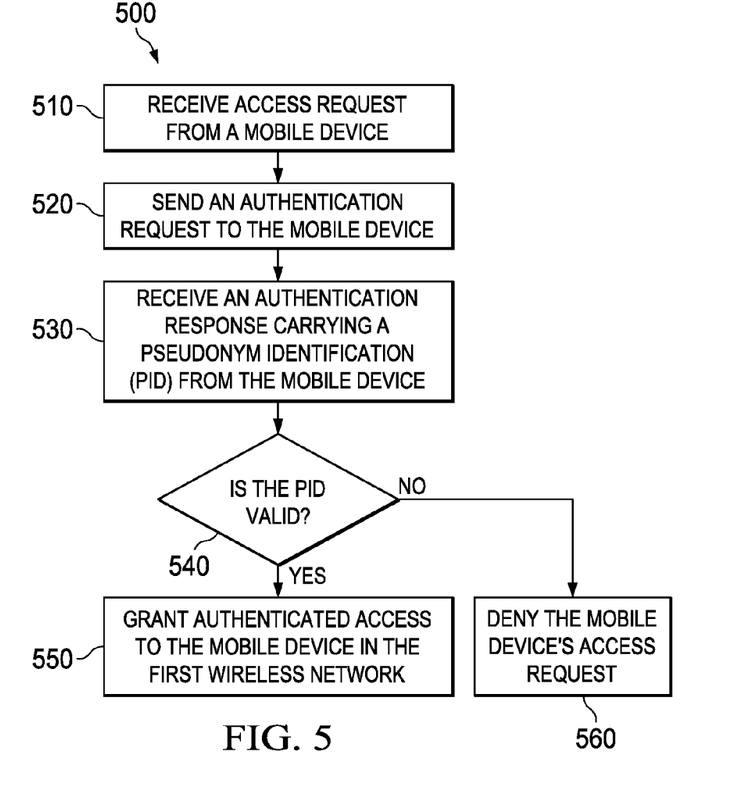
FIG. 5 illustrates a flowchart of another embodiment method for achieving fast authentication during inter-domain handovers.

FIG. 5 illustrates a method 500 for achieving fast authentication during an inter-domain handover, as might be performed by an authentication server. As shown, the method 500 begins at step 510, where the access server receives an access request from a mobile device. Next, the method 500 proceeds to step 520, where the authentication server sends an authentication request to the mobile device. Subsequently, the method 500 proceeds to step 530, where the authentication server receives an authentication response carrying a pseudonym identification (PID) from the mobile device. The PID may have been generated during an ECDH key exchange between the mobile device and an application server in a second wireless network. Thereafter, the method 500 proceeds to step 540, where the authentication server determines whether the PID is valid, which may include performing an online or offline validation procedure. If the PID is valid, then the method 500 proceeds to step 550, where the authentication server grants authenticated access to the mobile device in first wireless network. Alternatively, if the PID is not valid, then the method 500 proceeds to step 560, where the authentication server denies the mobile device's access request.

Figure 6:
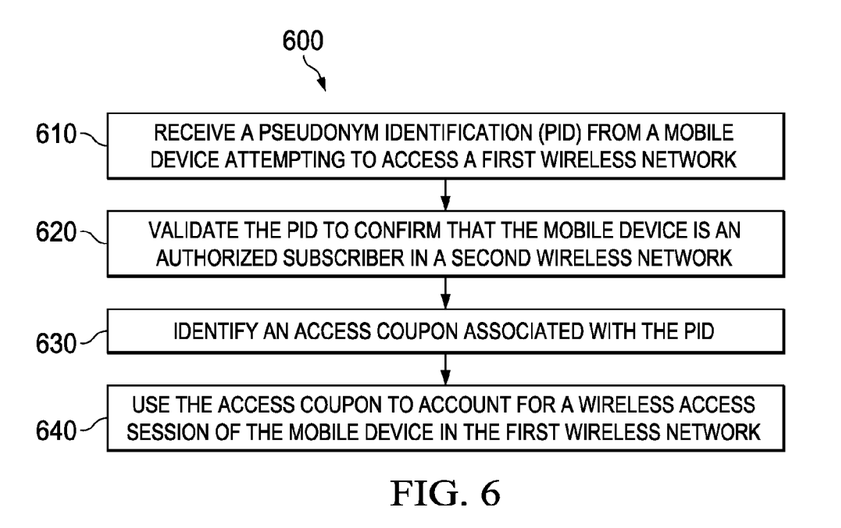
FIG. 6 illustrates a flowchart of yet another embodiment method for achieving fast authentication during inter-domain handovers.

In some embodiments, a PID may be used as prepayment system, for example, an electronic coupon in order to provide subscribers of one wireless network with access to another wireless network to which they are not directly subscribed but associated with trusted network. For example, network operators of proximately located wireless networks may enter into federated agreements to enable fast authentication for inter-domain handovers, as well as to allow PIDs to be used to track a subscriber's roaming usage, e.g., LTE users' usage may be tracked in a Wi-Fi network, or vice versa. FIG. 6 illustrates a flowchart of a method for providing access to a first wireless network for subscribers of a second wireless network, as might be performed by an accounting server associated with the first wireless network. As shown, the method 600 begins at step 610, where the accounting server receives a PID from a mobile device attempting to access a first wireless network. Thereafter, the method 600 proceeds to step 620, where the accounting server validates the PID to confirm that the mobile device is an authorized subscriber in a second wireless network. Next, the method 600 proceeds to step 630, where the accounting server identifies an access coupon associated with the PID. The access coupon may be any mechanism configured to provide subscribers of one wireless network with access to another wireless network to which they are not subscribed. In one embodiment, the access coupon includes a mechanism for transferring a usage cost of a wireless access session of the mobile device in the first wireless network to the mobile device's subscriber account in the second wireless network. In another embodiment, the access coupon includes a mechanism for settling a usage cost of a wireless access session of the mobile device in the first wireless network with a network service provider associated with the second wireless network. For example, the access coupon may correspond to pre-paid credits of the mobile device's subscriber account or the network service provider associated with the second wireless network. Alternatively, the access coupon may correspond to an open line of credit for the mobile device's subscriber account or the network service provider associated with the second wireless network. Once the access coupon is identified, the method 600 proceeds to step 640, where the access coupon is used to account for a wireless access session of the mobile device in the first wireless network. In some embodiments, this accounting may simply include allowing the mobile device to access the first wireless network free of charge if, for example, the federated agreement specifies that subscribers of the second wireless network are to have unfettered access to the first wireless network. Alternatively, using the access coupon to account for the wireless access session may include deducting a usage cost from a prepaid credit associated with the access coupon. As another example, the usage cost may be associated with the access coupon and/or the PID in an invoice, which may be submitted to the network service provider of the second wireless network for settlement. Submission of the invoice may be immediate (e.g., online submission) or deferred (e.g., offline submission).

Figure 7:
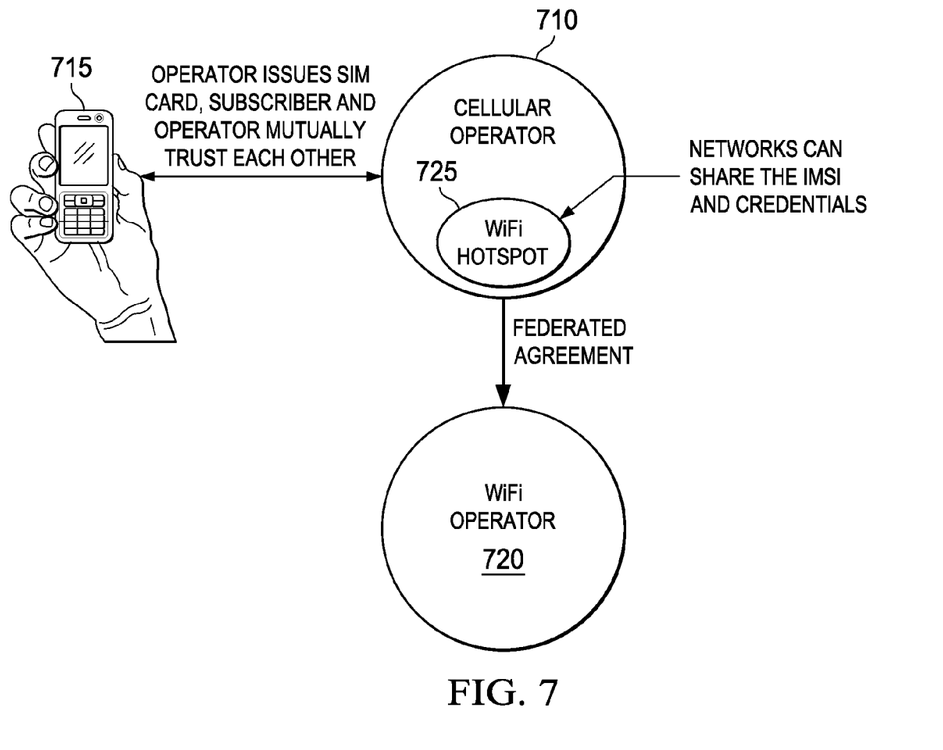
FIG. 7 illustrates a diagram of networks participating in a federated service agreement.
Figure 8:
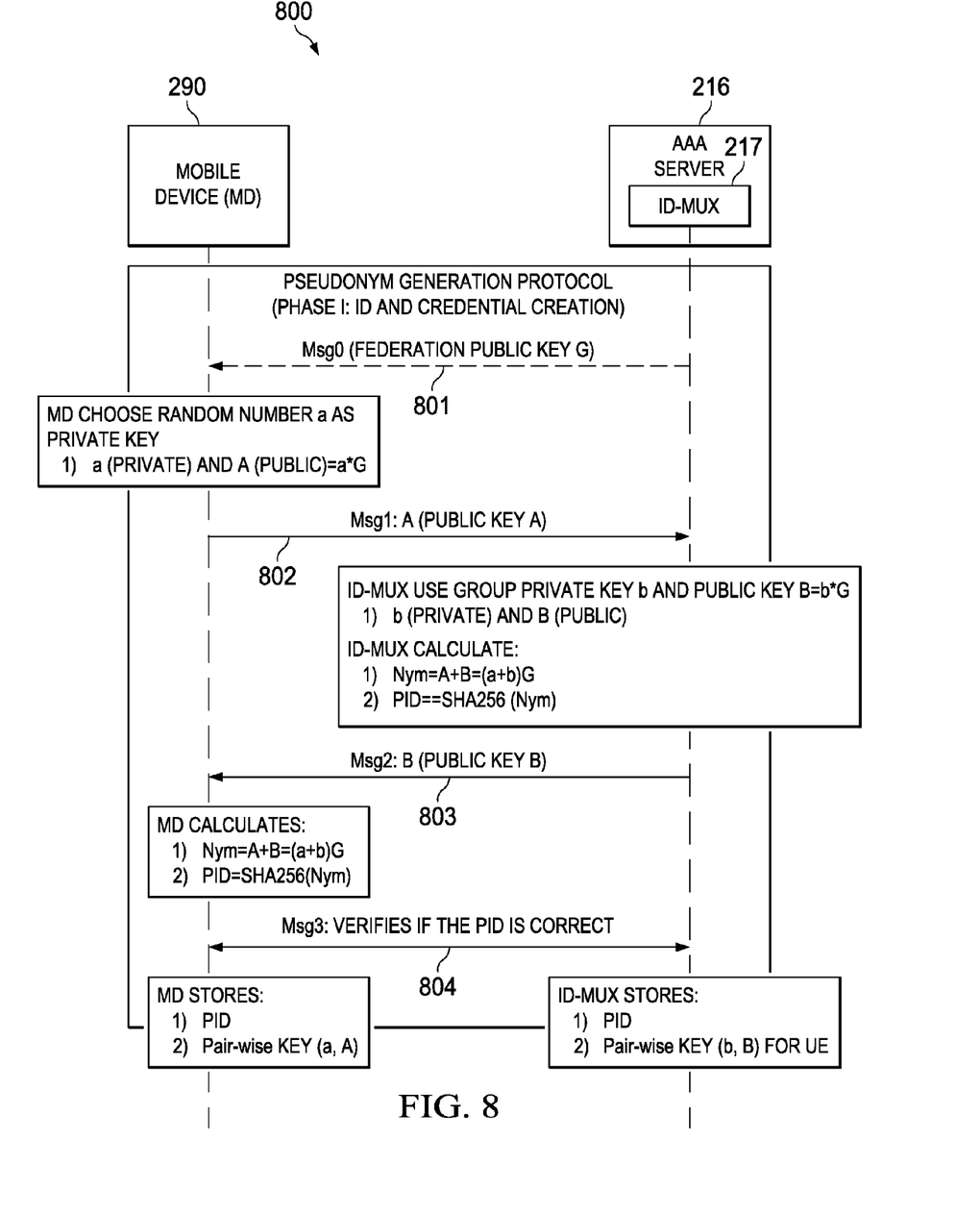
FIG. 8 illustrates a protocol diagram of an embodiment communications sequence for generating a pseudonym identification (PID)

Network operators of proximately located wireless networks may enter into federated agreements to enable fast authentication for inter-domain handovers, as well as to allow PIDs to be used to track a subscriber's roaming usage. FIG. 7 illustrates a diagram of networks participating in a federated service agreement. As shown, a cellular provider 710 may enter into a federated agreement with a Wi-Fi operator 720 to enable a subscriber 715 of the cellular provider 710 to access a Wi-Fi hotspot 725. In this disclosure, PIDs may conform with the pseudonym identification specified in request for comments (RFC) 4187, which is incorporated by reference herein as if reproduced in its entirety. FIG. 8 illustrates a protocol diagram of an embodiment communications sequence 800 for generating a pseudonym identification (PID), as may be performed between a mobile device and a AAA server 216. In some embodiments, one or more steps may be performed by an identification multiplexer (ID MUX) 217 in the AAA server 216. As shown, the communications sequence 800 begins when the AAA server 216 sends a message 801 to the mobile device 290. The message 801 may include a "federation public key G," and may prompt the mobile device to compute a "public key A" based on a private key of the mobile device ("private key a") and the "federation public key G." In one example, the "public key A" is obtained according to the following formula: $A=a*G$. In some embodiments, the "private key a" is a random number selected by the mobile device 290. In other embodiments, the "private key a" is assigned to the mobile device 290 by a network service provider to which the mobile device 290 subscribes. After computing the "public key A," the mobile device 290 communicates the "public key A" to the AAA server 216 via a message 802. Upon receiving the message 802, the AAA server 216 uses the "public key A" to compute a validation PID and also computes a "public key B" based on a "private key b" of the AAA server 216 and the "federation public key B. In one example, the "public key B" is obtained according to the following formula: B=b*G. Moreover, the validation PID may be obtained by first calculating a pseudorandom number (Nym) based on the "public key A" and the "public key B," and then computing a cryptographic hash of the Nym to obtain the validation PID. For example, the Nym may be obtained according to the following formula: Nym=A+B=(a+b)G. Additionally, computing a cryptographic hash of the Nym to obtain the PID may include applying any cryptographic hash function to the Nym, e.g., SHA-2(Nym), etc. After calculating the "public key B" and the PID, the AAA server 216 may send a message 803 carrying the "public key B" to the mobile device 290. Upon receiving the message 803, the mobile device 290 calculates the PID based on the "public key A" and the "public key B." Thereafter, the mobile device 290 and the AAA server 216 exchange one or messages 804 to validate the PID generated by the mobile device 290. The one or messages 804 may include a message carrying the PID computed by the mobile device 290 (or a derivative thereof) to the AAA server 216, as well an acknowledgement message confirming validation of the PID by the AAA server 216. Validation may be performed by comparing the validation PID computed by the AAA server 216 with the PID computed by the mobile device 290. After the PID is validated, the AAA server 216 stores an entry in a database associating the PID with a pair-wise key (b, B). Similarly, the mobile device 290 stores an entry in a table associating the PID with a pair-wise key (a, A).

Figure 9:
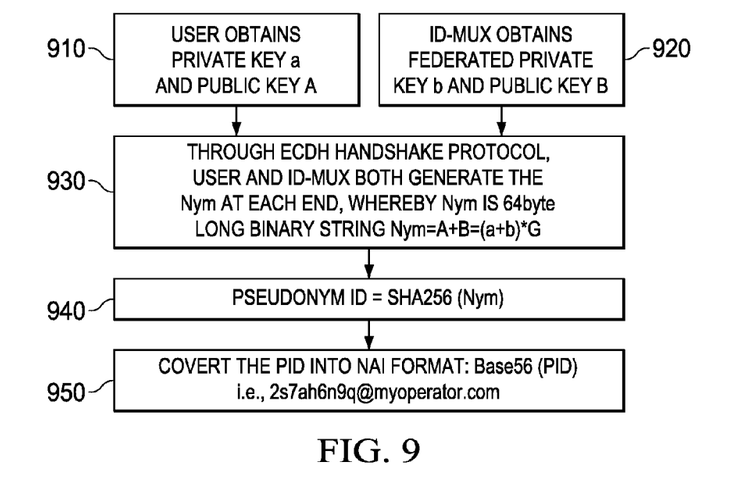
FIG. 9 illustrates a flowchart of an embodiment method for generating a PID.

FIG. 9 illustrates a flowchart of an embodiment method 900 for generating a PID. As shown, the method 900 begins with steps 910, 920, where the user obtains a "private key a" and a "public key A", and the ID-MUX obtains a federated "private key b" to a "public key B" (respectively). Thereafter, the method 900 proceeds to step 930, where the user and the ID-MUX generate a Nym during an ECDH key exchange of the "public key A" and the "public key B." Thereafter, the method 900 proceeds to step 940, where the user and the ID-MUX generate the PID by applying a hashing function to the Nym. Next, the method 900 proceeds to step 950, where the user and the ID-MUX produce a derivative of the PID for purposes of validating the PID over a channel. In one embodiment, the user and the ID-MUX achieve this by converting the PID into a network access identifier (NAI) format to obtain a derivate of the PID. The derivative of the PID may include a base-56 integer encoding of the PID.

Figure 10:
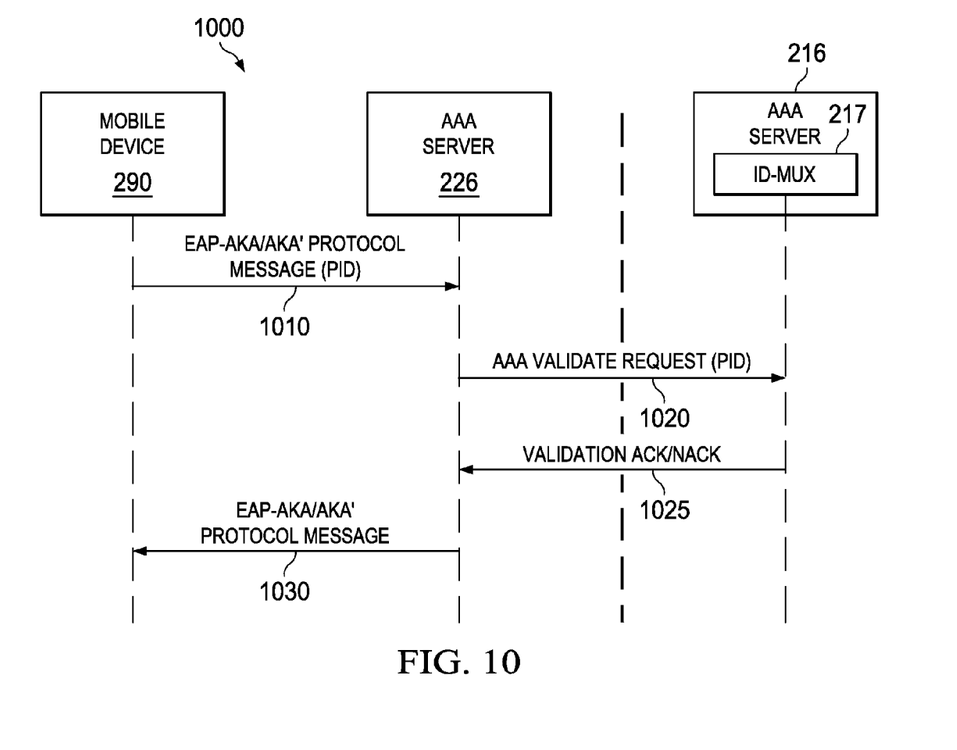
FIG. 10 illustrates a protocol diagram of an embodiment communications sequence for achieving online PID validation.

In some embodiments, an online PID validation procedure may be used to achieve fast authentication following an inter-domain handover. FIG. 10 illustrates a protocol diagram of an embodiment communications sequence 1000 for performing online validation of a PID during fast authentication. As shown, the communications sequence 1000 begins when the mobile device 290 sends an EAP-AKA/AKA' protocol message 1010 carrying a PID to a AAA server 226 of a target network. Thereafter, the AAA server 226 sends a AAA validate request message 1020 carrying the PID to the AAA server 216 of the subscriber network. Next, the AAA server 216 returns a validation ACK/NACK message 1025 to the AAA server 226 to indicate whether or not the PID is valid. Finally, the AAA server 226 returns an EAP-AKA/AKA' protocol message 1030 to the mobile device 290 to indicate whether authentication has been granted.

Figure 11:
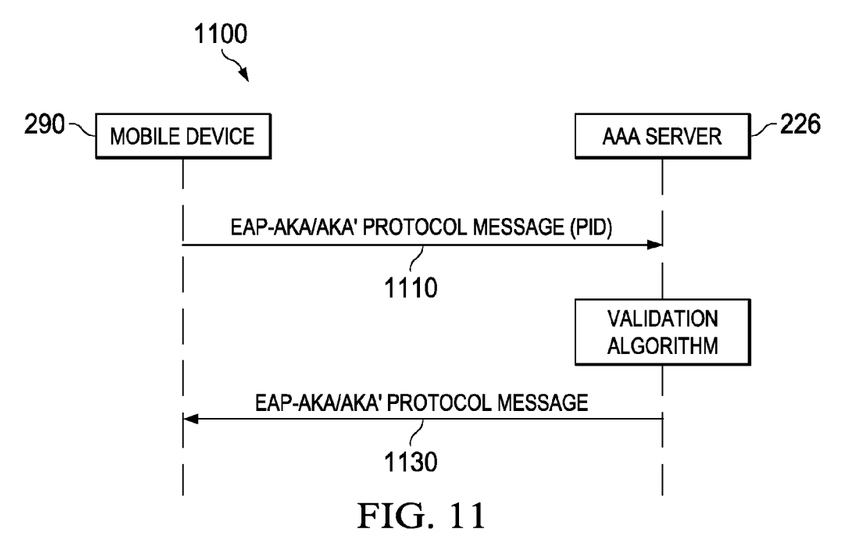
FIG. 11 illustrates a protocol diagram of an embodiment communications sequence for achieving offline PID validation.

In other embodiments, an offline PID validation procedure may be used to achieve fast authentication following an inter-domain handover. FIG. 11 illustrates a protocol diagram of an embodiment communications sequence 1100 for performing online validation of a PID during fast authentication. As shown, the communications sequence 1100 begins when the mobile device 290 sends an EAP-AKA/AKA' protocol message 1110 carrying a PID to an AAA server 226 of a target network. Thereafter, the AAA server 226 performs a validation algorithm to verify that the PID is valid. This may include computing a valid PID based on the federated information between the target network and the subscriber/source network, e.g., public key of the subscriber network, etc. Next, AAA server 226 returns an EAP-AKA/AKA' protocol message 1130 to the mobile device 290 to indicate whether authentication has been granted.

Figure 12:
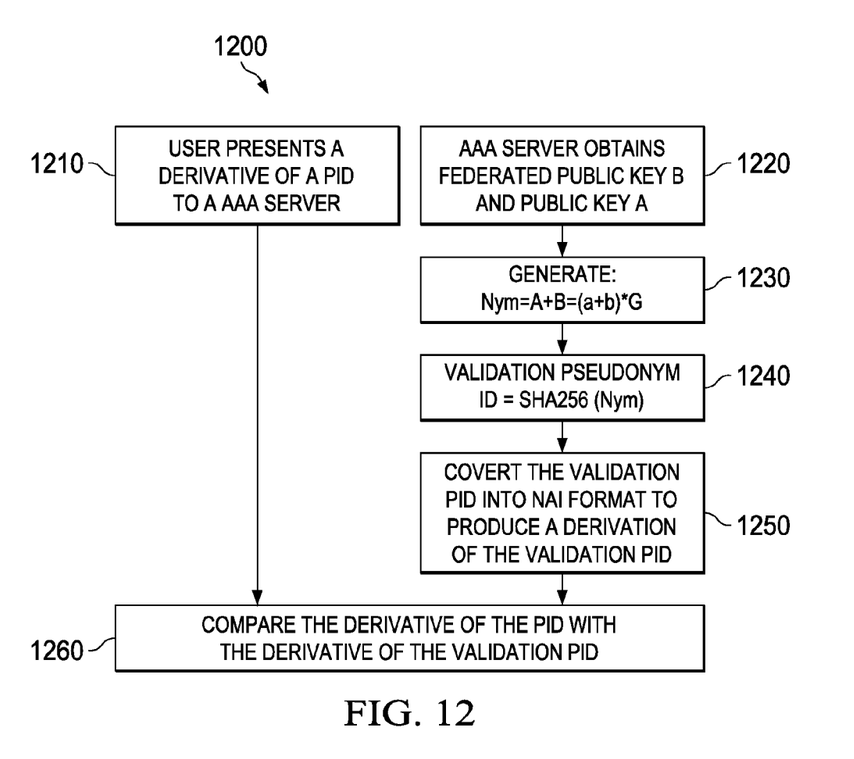
FIG. 12 illustrates a flowchart of an embodiment method for using a PID to achieve fast authentication following an inter-domain handover.

FIG. 12 illustrates a flowchart of an embodiment method 1200 for using a PID to achieve fast authentication following an inter-domain handover. As shown, the method 1200 begins with step 1210, where the user presents a PID to a AAA server in a target network. Thereafter, the method 1200 proceeds to step 1220, where the AAA server obtains a federated public key of a target network ("public key B") and a public key of the user ("public key A"). The method then proceeds to step 1230, where the AAA server generates a Nym based on the "public key A" and the "public key B." Thereafter, the method 1200 proceeds to step 1240, where the AAA server generates a validation PID by applying a hashing function to the Nym. Next, the method 1200 proceeds to step 1250, where the AAA server produces a derivative of the validation PID by converting the validation PID into a network access identifier (NAI) format. Thereafter, the method 1200 proceeds to step 1260, where the AAA server compares the derivative of the PID presented by the user to the derivative of the validation PID. If they match, then the AAA server grants authentication to the user.

Figure 13:
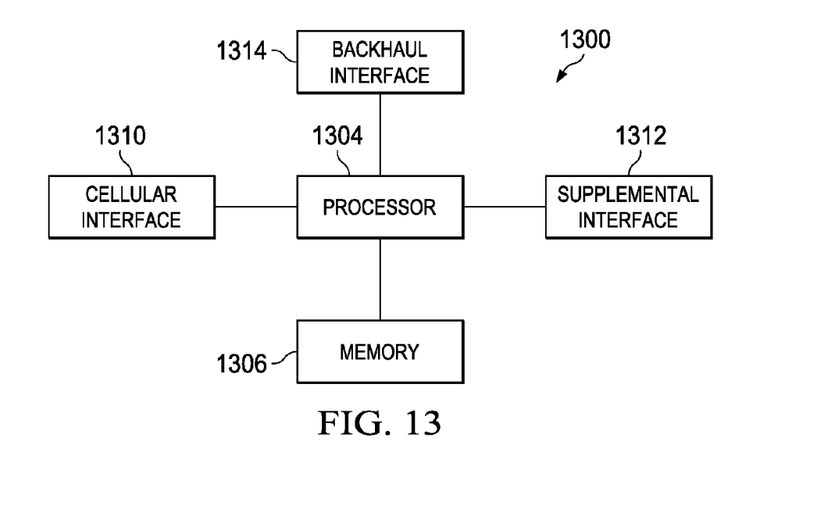
FIG. 13 illustrates a diagram of an embodiment communications device.

FIG. 13 illustrates a block diagram of an embodiment of a communications device 1300, which may be equivalent to one or more devices (e.g., UEs, NBs, etc.) discussed above. The communications device 1300 may include a processor 1304, a memory 1306, a cellular interface 1310, a supplemental interface 1312, and a backhaul interface 1314, which may (or may not) be arranged as shown in FIG. 13. The processor 1304 may be any component capable of performing computations and/or other processing related tasks, and the memory 1306 may be any component capable of storing programming and/or instructions for the processor 1304. The cellular interface 1310 may be any component or collection of components that allows the communications device 1300 to communicate using a cellular signal, and may be used to receive and/or transmit information over a cellular connection of a cellular network. The supplemental interface 1312 may be any component or collection of components that allows the communications device 1300 to communicate data or control information via a supplemental protocol. For instance, the supplemental interface 1312 may be a non-cellular wireless interface for communicating in accordance with a Wireless-Fidelity (Wi-Fi) or Bluetooth protocol. Alternatively, the supplemental interface 1312 may be a wireline interface. The backhaul interface 1314 may be optionally included in the communications device 1300, and may comprise any component or collection of components that allows the communications device 1300 to communicate with another device via a backhaul network.

Figure 14:
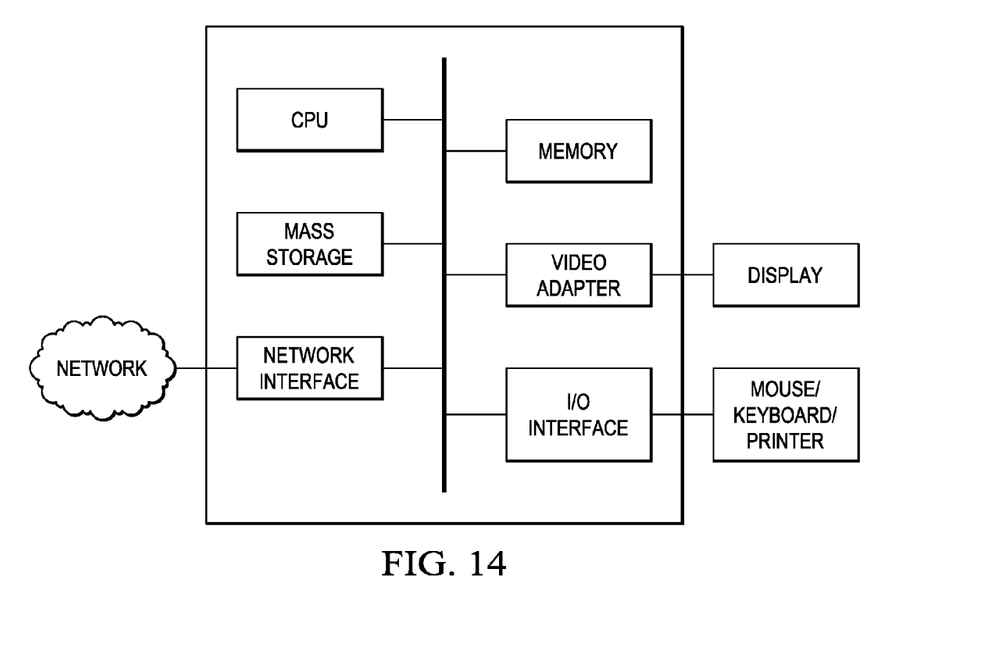
FIG. 14 illustrates a diagram of an embodiment computing platform.

FIG. 14 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for fast authentication, the method comprising:
    deriving, by a mobile station, a pseudonym identification (PID) during an Elliptic Curve Diffie-Hellman (ECDH) key exchange with a first authentication server in a first wireless access network, wherein the PID is not known by the first authentication server; and
    obtaining, by the mobile station, authentication from a second authentication server in a second wireless access network in accordance with the PID derived during the ECDH key exchange between the mobile station and the first authentication server, wherein the first wireless network and the second wireless network are controlled by different network operators.

2. The method of claim 1, wherein the first wireless network and the second wireless network operate in different administrative domains.

3. The method of claim 1, wherein the first wireless network is operated by a first network operator, and wherein the second wireless network is operated by a second network that is in a federated agreement with the first network operator.

4. The method of claim 1, wherein deriving the PID during the ECDH key exchange with the first authentication server comprises:
    sending, by the mobile station, a first public key or a derivative of the first public key to the first authentication server, the first public key being associated with the mobile station;
    receiving, by the mobile station, a second public key or a derivative of the second public key from the first authentication server; and
    deriving, by the mobile station, the PID in accordance with the first public key and the second public key.

5. The method of claim 4, wherein obtaining authentication from the second authentication server in the second wireless network in accordance with the PID comprises:
    sending, by the mobile station, the first public key or the derivative of the first public key to the second authentication server;
    computing a hash value of the PID; and
    sending the hash value of the PID to the second authentication server, wherein the hash value of the PID is configured to be validated by the second authentication server to authenticate the mobile station in the second wireless network.

6. A method for fast authentication, the method comprising:
    deriving, by a mobile station, a pseudonym identification (PID) during an Elliptic Curve Diffie-Hellman (ECDH) key exchange with a first authentication server in a first wireless access network, wherein deriving the PID during the ECDH key exchange with the first authentication server includes sending a first public key associated with the mobile station, or a derivative of the first public key, to the first authentication server, receiving a second public key or a derivative of the second public key from the first authentication server, and deriving the PID in accordance with the first public key and the second public key; and
    obtaining, by the mobile station, authentication from a second authentication server in a second wireless access network in accordance with the PID derived during the ECDH key exchange between the mobile station and the first authentication server, wherein the first wireless network and the second wireless network are controlled by different network operators, wherein obtaining authentication from the second authentication server in the second wireless network in accordance with the PID comprises sending the first public key or the derivative of the first public key to the second authentication server, computing a hash value of the PID, and sending the hash value of the PID to the second authentication server, wherein the hash value of the PID is validated by the second authentication server to authenticate the mobile station in the second wireless network, and wherein the hash value of the PID is configured to be validated via a validation protocol between the second authentication server and the first authentication server.

7. A method for fast authentication, the method comprising:
deriving, by a mobile station, a pseudonym identification (PID) during an Elliptic Curve Diffie-Hellman (ECDH) key exchange with a first authentication server in a first wireless access network, wherein deriving the PID during the ECDH key exchange with the first authentication server includes sending a first public key associated with the mobile station, or a derivative of the first public key, to the first authentication server, receiving a second public key or a derivative of the second public key from the first authentication server, and deriving the PID in accordance with the first public key and the second public key; and
obtaining, by the mobile station, authentication from a second authentication server in a second wireless access network in accordance with the PID derived during the ECDH key exchange between the mobile station and the first authentication server, wherein the first wireless network and the second wireless network are controlled by different network operators, wherein obtaining authentication from the second authentication server in the second wireless network in accordance with the PID comprises sending the first public key or the derivative of the first public key to the second authentication server, computing a hash value of the PID, and sending the hash value of the PID to the second authentication server, wherein the hash value of the PID is validated by the second authentication server to authenticate the mobile station in the second wireless network, and wherein the hash value of the PID is configured to be validated via an offline validation procedure by the second authentication server, the offline validation procedure enabling the second authentication server to validate the hash value of the PID without communicating with the first authentication server in real-time.

8. A mobile station comprising:
a processor; and
a computer readable storage medium storing programming for execution by the processor, the programming including instructions to:
derive a pseudonym identification (PID) during an Elliptic Curve Diffie-Hellman (ECDH) key exchange with a first authentication server in a first wireless access network, wherein the PID is not known by the first authentication server; and
obtain authentication from a second authentication server in a second wireless access network in accordance with the PID derived during the ECDH key exchange between the mobile station and the first authentication server,
wherein the first wireless network and the second wireless network are controlled by different network operators.

9. The mobile station of claim 8, wherein the first wireless network and the second wireless network operate in different administrative domains.

10. The mobile station of claim 8, wherein the first wireless network is operated by a first network operator, and wherein the second wireless network is operated by a second network that is in a federated agreement with the first network operator.

11. The mobile station of claim 8, wherein the instructions to derive the PID during the ECDH key exchange with the first authentication server include instructions to:
send a first public key or a derivative of the first public key to the first authentication server, the first public key being associated with the mobile station;
receive a second public key or a derivative of the second public key from the first authentication server; and
derive the PID in accordance with the first public key and the second public key.

12. The mobile station of claim 11, wherein the instructions to obtain authentication from the second authentication server in the second wireless network in accordance with the PID include instructions to:
send the first public key or the derivative of the first public key to the second authentication server;
compute a hash value of the PID; and
send the hash value of the PID to the second authentication server.

13. The mobile station of 12, wherein the hash value of the PID is validated by the second authentication server to authenticate the mobile station in the second wireless network.

14. The mobile station of 13, wherein the hash value of the PID is validated via a validation protocol between the second authentication server and the first authentication server.

15. The mobile station of 13, wherein the hash value of the PID is validated via an offline validation procedure by the second authentication server, the offline validation procedure enabling the second authentication server to validate the hash value of the PID without communicating with the first authentication server in real-time.

* * * * *